(12) United States Patent
Berger et al.

(10) Patent No.: US 8,932,167 B2
(45) Date of Patent: Jan. 13, 2015

(54) HYDRAULIC CONTROL SYSTEM FOR AN AUTOMATIC TRANSMISSION

(71) Applicant: GM Global Technology Operations LLC, Detroit, MI (US)

(72) Inventors: Todd R. Berger, Pinckney, MI (US); Christopher G. Benson, Rochester Hills, MI (US); John E. Marano, Milford, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 71 days.

(21) Appl. No.: 13/905,180

(22) Filed: May 30, 2013

(65) Prior Publication Data

US 2013/0327172 A1    Dec. 12, 2013

Related U.S. Application Data

(60) Provisional application No. 61/656,796, filed on Jun. 7, 2012.

(51) Int. Cl.
*F16H 61/26*    (2006.01)

(52) U.S. Cl.
USPC .................... 475/127; 475/131; 475/144

(58) Field of Classification Search
USPC ................... 475/144, 131, 132, 127
See application file for complete search history.

(56) References Cited

U.S. PATENT DOCUMENTS

| | | | | |
|---|---|---|---|---|
| 3,233,478 A | * | 2/1966 | General et al. | 475/129 |
| 6,983,668 B2 | * | 1/2006 | Powell et al. | 74/335 |
| 7,476,173 B2 | * | 1/2009 | Ko | 475/132 |
| 8,210,976 B2 | * | 7/2012 | Xie et al. | 475/116 |
| 8,435,148 B2 | * | 5/2013 | Moorman | 475/116 |

* cited by examiner

*Primary Examiner* — Sherry Estremsky

(57) ABSTRACT

A hydraulic control system for a transmission of a motor vehicle includes a source of pressurized hydraulic fluid that communicates with an analog electronic transmission range selection (ETRS) subsystem or a manual valve. The ETRS subsystem includes an ETRS valve, a park servo, a park mechanism, a mode valve, and a plurality of solenoids. The ETRS and manual valve communicate with a clutch actuator subsystem that engages a one-way clutch and six clutches/brakes.

20 Claims, 9 Drawing Sheets

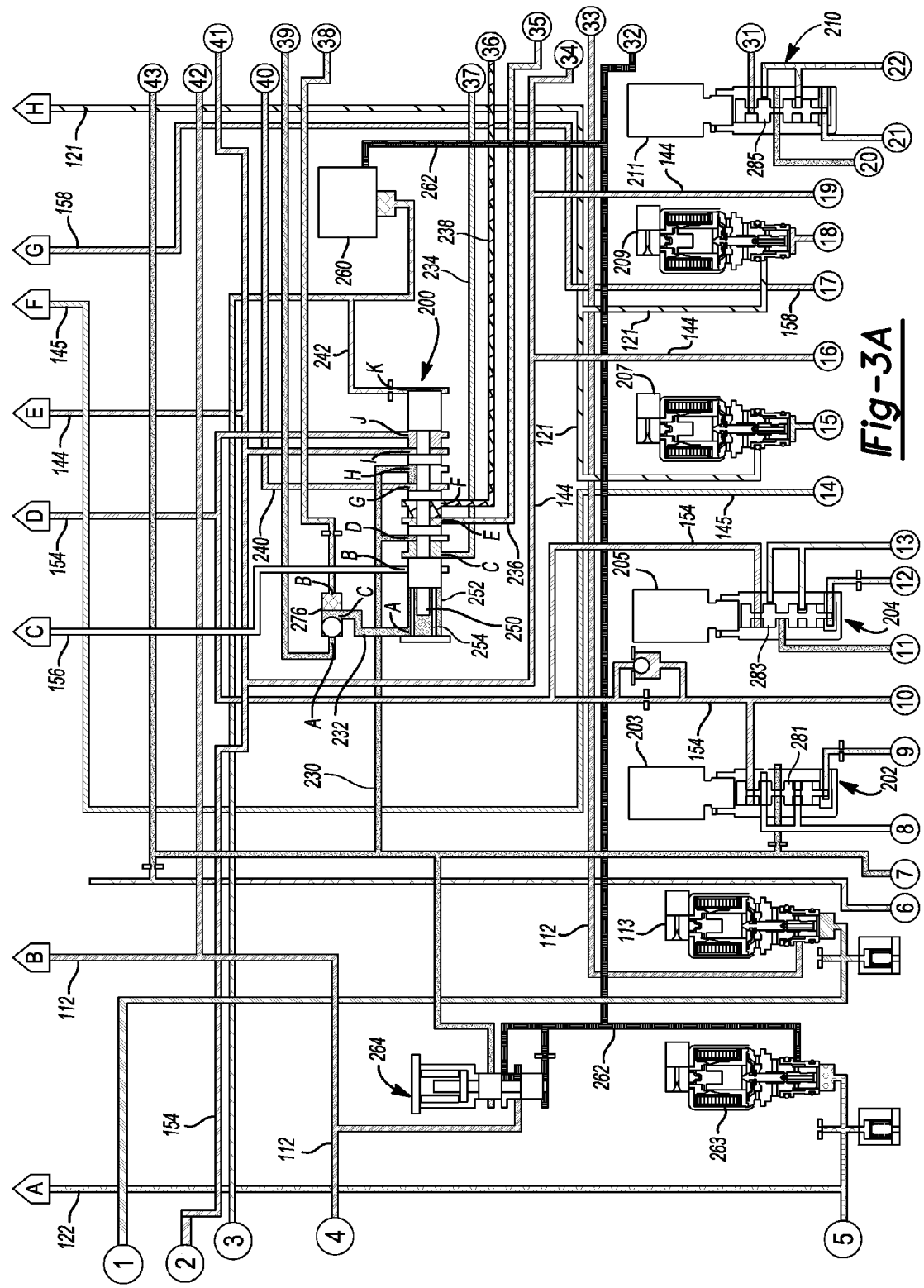

HYDRAULIC CONTROL SYSTEM FOR AN AUTOMATIC TRANSMISSION

CROSS-REFERENCE TO RELATED APPLICATIONS

This application claims the benefit of U.S. Provisional Application No. 61/656,796 filed Jun. 7, 2012. The disclosure of the above application is incorporated herein by reference.

TECHNICAL FIELD

The invention relates to a control system for an automatic transmission, and more particularly to an electro-hydraulic control system.

BACKGROUND

A typical automatic transmission includes a hydraulic control system that is employed to provide cooling and lubrication to components within the transmission and to actuate a plurality of torque transmitting devices. These torque transmitting devices may be, for example, friction clutches and brakes arranged with gear sets or in a torque converter. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to various subsystems including lubrication subsystems, cooler subsystems, torque converter clutch control subsystems, and shift actuator subsystems that include actuators that engage the torque transmitting devices. The pressurized hydraulic fluid delivered to the shift actuators is used to engage or disengage the torque transmitting devices in order to obtain different gear ratios.

While previous hydraulic control systems are useful for their intended purpose, the need for new and improved hydraulic control system configurations within transmissions which exhibit improved performance, especially from the standpoints of efficiency, responsiveness and smoothness, is essentially constant. Accordingly, there is a need for an improved, cost-effective hydraulic control system for use in a hydraulically actuated automatic transmission.

SUMMARY

A hydraulic control system for a transmission is provided. The hydraulic control system includes a source of pressurized hydraulic fluid that communicates with an analog electronic transmission range selection (ETRS) subsystem or a manual valve. The ETRS subsystem includes an ETRS valve, a park servo, a park mechanism, a mode valve, and a plurality of solenoids. The ETRS and manual valve communicate with a clutch actuator subsystem that engages a one-way clutch and six clutches/brakes.

Further features, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

FIG. 3A is a diagram of yet another portion of the hydraulic control system according to the principles of the present invention;

DESCRIPTION

Figure 1:
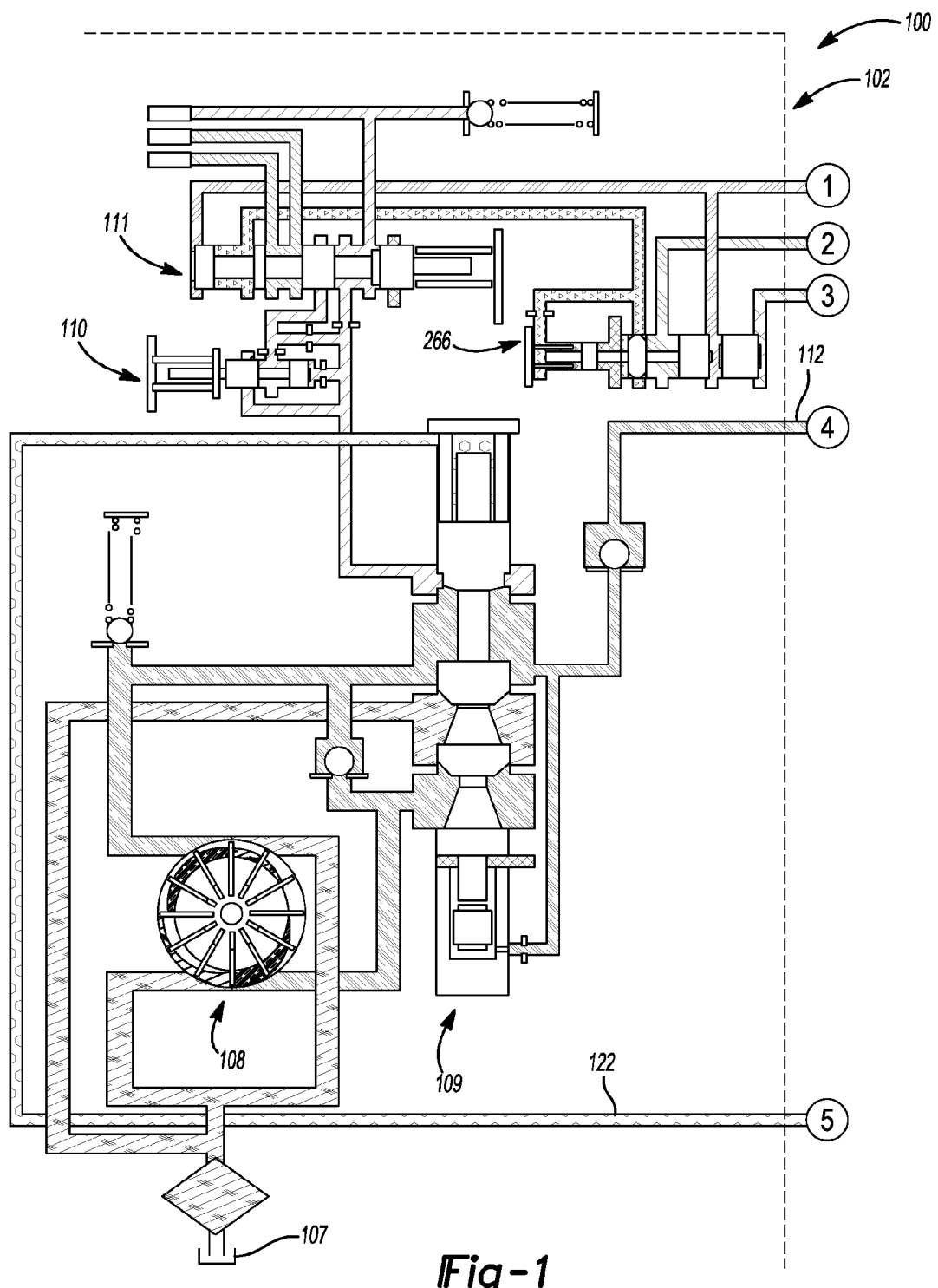
FIG. 1 is a diagram of a portion of a hydraulic control system according to the principles of the present invention.
Figure 2:
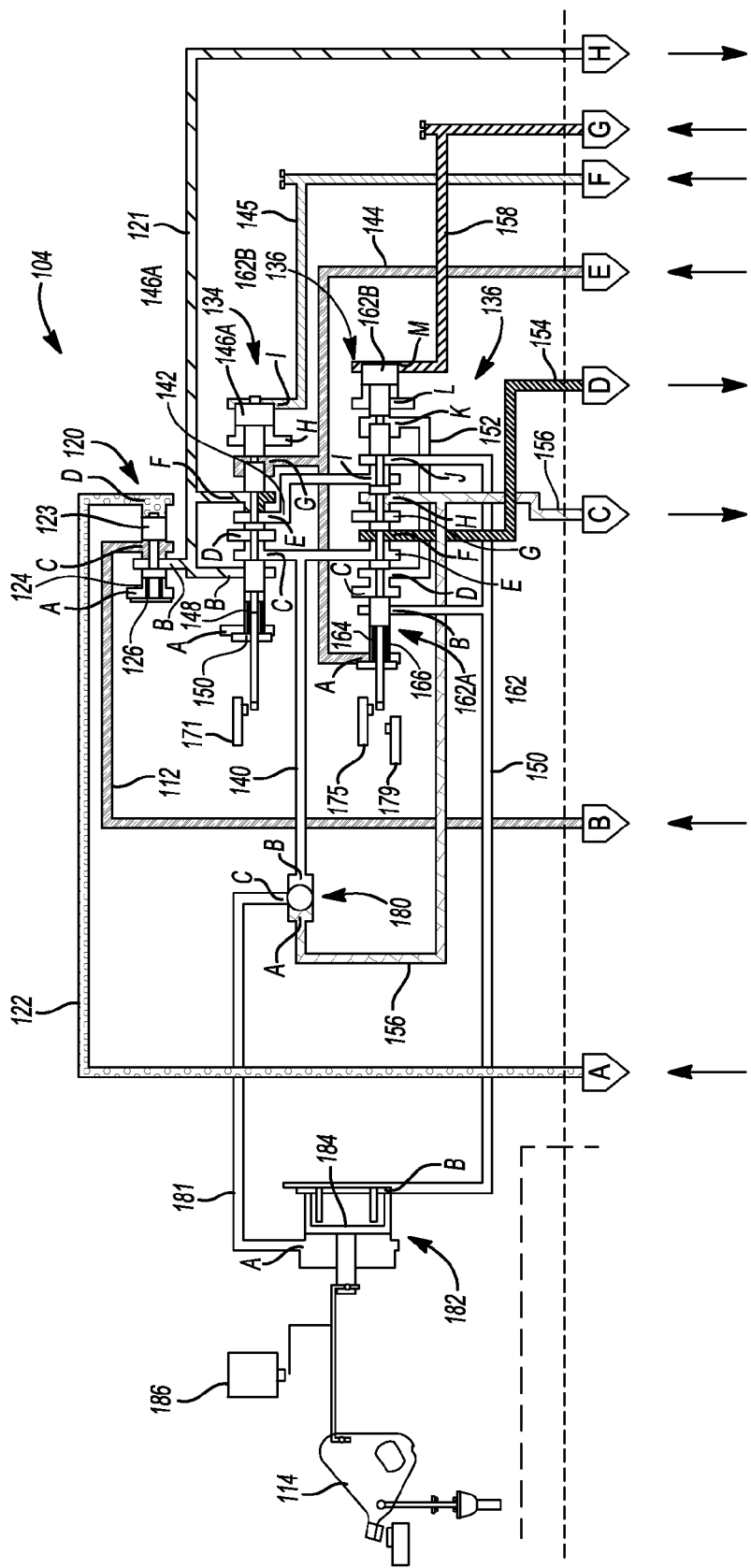
FIG. 2 is a diagram of another portion of the hydraulic control system according to the principles of the present invention.
Figure 3B:
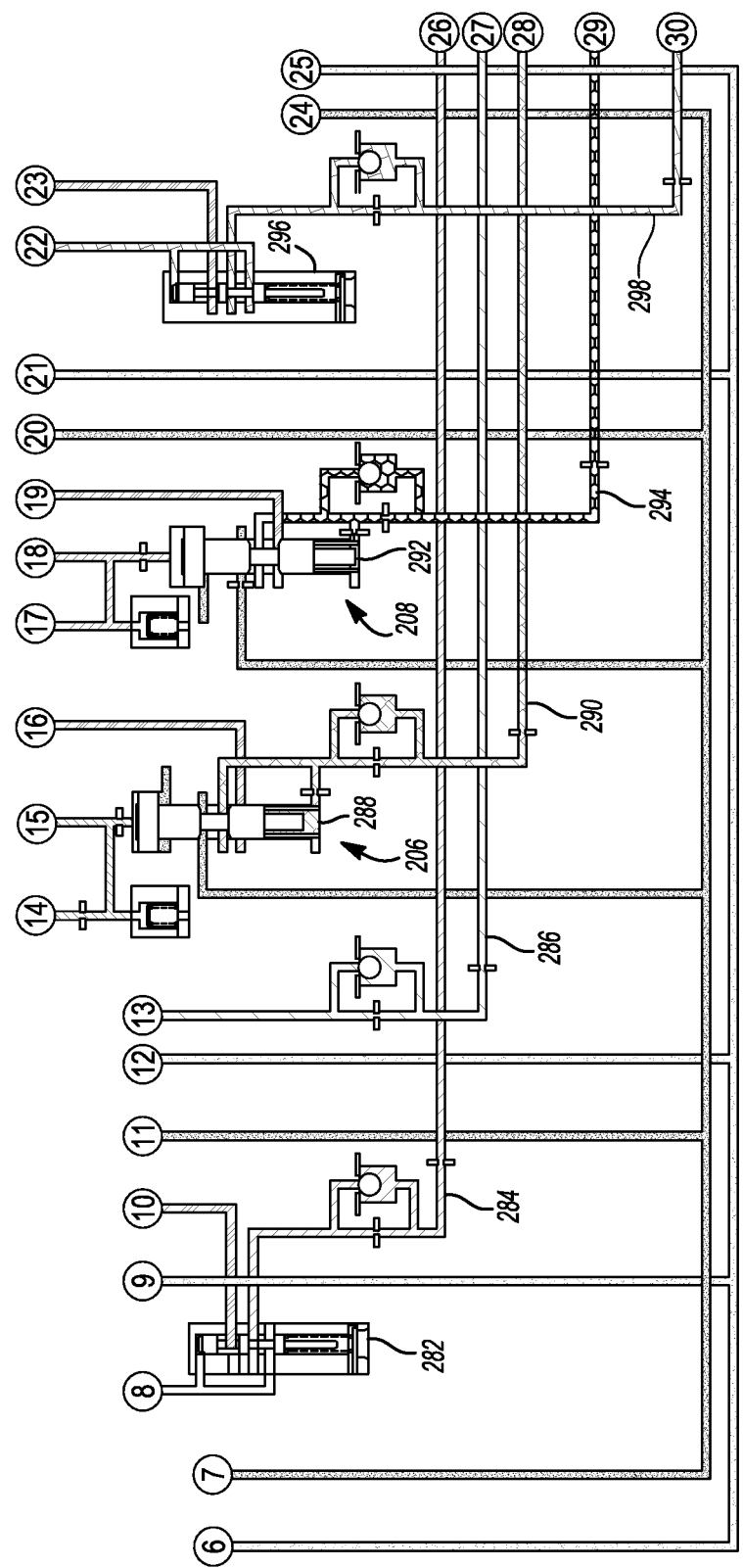
FIG. 3B is a diagram of yet another portion of the hydraulic control system according to the principles of the present invention.
Figure 3C:
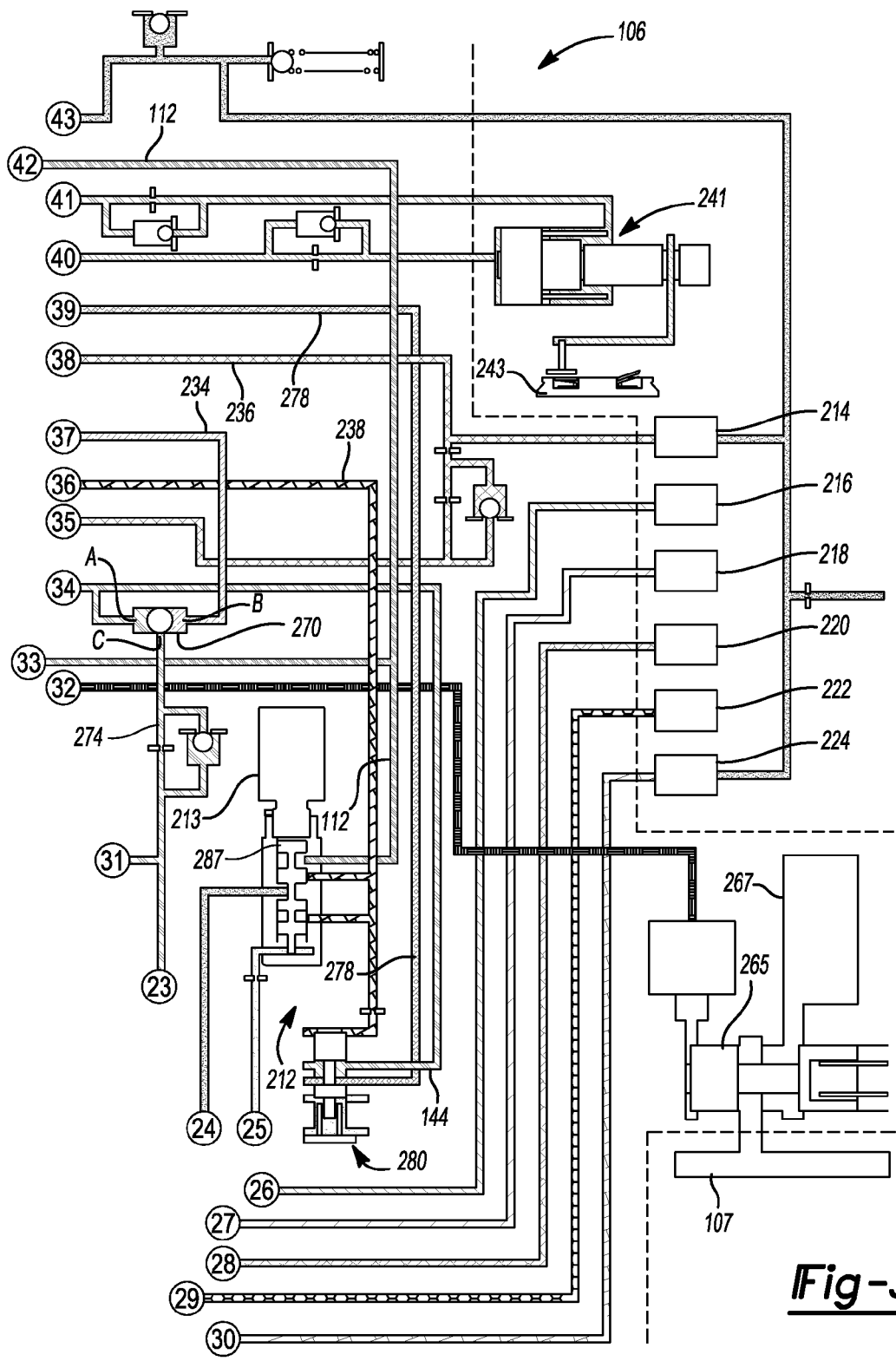
FIG. 3C is a diagram of yet another portion of the hydraulic control system according to the principles of the present invention.

With combined reference to FIGS. 1, 2, 3A-C, a portion of a hydraulic control system according to the principles of the present invention is generally indicated by reference number 100. The hydraulic control system 100 generally includes a plurality of interconnected or hydraulically communicating subsystems including a pressure regulator subsystem 102, an electronic transmission range selection (ETRS) control subsystem 104, and a clutch control subsystem 106. The hydraulic control system 100 may also include various other subsystems or modules, such as a lubrication subsystem, a torque converter clutch subsystem, and/or a cooling subsystem, without departing from the scope of the present invention.

The pressure regulator subsystem 102 is operable to provide and regulate pressurized hydraulic fluid, such as transmission oil, throughout the hydraulic control system 100. The pressure regulator subsystem 102 draws hydraulic fluid from a sump 107. The sump 107 is a tank or reservoir preferably disposed at the bottom of a transmission housing to which the hydraulic fluid returns and collects from various components and regions of the transmission. The hydraulic fluid is forced from the sump 107 and communicated throughout the hydraulic control system 100 via a pump 108. The pump is preferably driven by an engine (not shown) and may be, for example, a gear pump, a vane pump, a gerotor pump, or any other positive displacement pump. The pressure regulator subsystem 102 may also include an alternate source of hydraulic fluid that includes an auxiliary pump (not shown) preferably driven by an electric engine, battery, or other prime mover (not shown). The pump 108 feeds pressurized hydraulic fluid at line pressure to a line pressure regulator valve 109. The line pressure regulator valve 109 communicates pressurized hydraulic fluid to a lubrication boost valve 110, a torque converter clutch (TCC) control valve 111, and a main supply line 112. The lubrication boost valve 110 and the TCC control valve 111 each feed lubrication and TCC circuits (not shown). The main supply line 112 feeds the ETRS subsystem 104 and the clutch actuator subsystem 106 as well as a TCC solenoid 113.

The ETRS control subsystem 104 connects the pressure regulator subsystem 102 with the clutch control subsystem 106. Generally, the ETRS control subsystem 104 converts electronic input for a requested range selection (Drive, Reverse, Park) into hydraulic and mechanical commands. The hydraulic commands use line pressure hydraulic fluid from the pressure regulator subsystem 102 via fluid line 112 to supply hydraulic fluid to the clutch actuator subsystem 106. The mechanical commands include engaging and disengaging a park mechanism 114.

The ETRS control subsystem 104 includes an enablement valve assembly 120. The enablement valve assembly includes fluid ports 120A-D. Fluid port 120A is an exhaust port that communicates with the sump 107 or an exhaust backfill circuit. Fluid port 120B communicates with a range feed line 121. Fluid port 120C communicates with the main supply line 112. Fluid port 120D communicates with a signal line 122. The enablement valve assembly 120 further includes a spool valve 123 is slidably disposed within a bore 124. When pressurized fluid is supplied through the signal line 122, fluid pressure acts upon the spool valve 123 through the fluid port 120D and moves the spool valve 123 against a spring 126 into a stroked position, by way of example. The spool valve 123 is actuated to a de-stroked position by the spring 126. When the spool valve 123 is stroked, the fluid port 120C communicates with the fluid port 120B.

The ETRS subsystem 104 further includes first and second mode valve assemblies 134, 136 that communicate in series with one another and with the enablement valve assembly 120. The first mode valve 134 includes ports 134A-I, numbered consecutively from left to right. Ports 134A, D, and H are exhaust ports that communicate with the sump 107 or an exhaust backfill circuit. Ports 134B and 134F communicate with the range feed line 121. Port 134C communicates with a fluid line 140. Port 134E communicates with a fluid line 142. Port 134G communicates with a fluid line 144. Port 134I communicates with a signal line 145.

The first mode valve assembly 134 further includes spool valves 146A and 146B slidably disposed within a bore 148. The spool 146 is actuated by the hydraulic fluid provided through lines 144 and 145 and by a spring 150. The spool 146 is moveable between a stroked position where the spring 150 is compressed and a de-stroked position. In the de-stroked position port 134F communicates with port 134E. Accordingly, the range feed line 121 communicates with line 142. When the first mode valve assembly 134 is stroked, port 134F is closed while port 134E exhausts and port 134B communicates with port 134C such that the range feed line 121 communicates with line 140.

The second mode valve assembly 136 generally includes ports 136A-M. Ports 136C, 136G, and 136L are exhaust ports that communicate with the sump 107 or an exhaust backfill circuit. Port 136A communicates with the fluid line 144. Ports 136B and 136J communicate with a Park feed line 150. Port 136D communicates with a sequence line 152 that communicates with port 136K. Port 136E communicates with fluid line 140. Port 136F communicates with a Drive line 154. Port 136H communicates with a Reverse line 156. Port 136I communicates with fluid line 142. Fluid port 136M communicates with a signal line 158.

The second mode valve assembly 136 includes a spool valves 162A and 162B slidably disposed within a bore 164. The spool valve 164 is moveable between a stroked position where a spring 166 is compressed and a de-stroked position where the spring 166 is not compressed. In the de-stroked position, port 136E communicates with port 136F and port 136I communicates with port 136J and port 136H exhausts.

Therefore, when the first mode valve 134 is stroked, the transmission is in "Drive" when the second mode valve assembly 136 is de-stroked and is providing hydraulic fluid to Drive line 154 and to the "1 feed" line 140, which will be described in further detail below. In the stroked position the port 136E communicates with the port 136D providing signal feedback to port 136K. Also, port 136I communicates with port 136H and feeds the Reverse fluid line 156 while ports 136B and 136F exhaust.

The first mode valve assembly 134 may include either one or two position sensors 171, and the second mode valve assembly 136 may include a pair of position sensors 175, 179, by way of example.

A check valve 180 is connected to fluid lines 140 and 156. The check valve 180 includes three ports 180A-C. The check valve 180 closes off whichever of the ports 180A and 180B that is delivering the lower hydraulic pressure and provides communication between whichever of the ports 180A and 180B having or delivering the higher hydraulic pressure and the outlet port 180C. Port 180A is connected to the Reverse fluid line 156. Port 180B is connected to fluid line 140. Port or outlet 180C is connected to an out-of-Park (OOP) fluid line 181.

The into-Park fluid line 150 and the OOP fluid line 181 each communicate with a Park servo valve 182. The Park servo valve 182 includes ports 182A and 182B each located on either side of a piston 184. The piston 184 is mechanically coupled to the park mechanism 114. Port 182A communicates with the OOP fluid line 181 and port 182B communicates with the into-Park fluid line 150. The piston 184 moves upon contact by the hydraulic fluid supplied by one of the fluid lines 181, 150, thereby mechanically disengaging or engaging the Park mechanism 114.

The Park mechanism 180 is connected with an out-of-Park (OOP) solenoid 186. The OOP solenoid 186 is actuatable to mechanically prevent the Park mechanism 180 from engaging during an engine stop-start event (i.e. when the vehicle is intended to be mobile during an automatic engine stop). The OOP 184 solenoid may also be used to disengage the Park servo valve 182 when it is desirable to operate in Drive or Reverse at other times.

As noted above, the ETRS subsystem 104 feeds hydraulic fluid to the clutch actuation control subsystem 106 via the range feed line 121, the Drive line 154 and the Reverse line 156 while the clutch actuation control subsystem 106 provides hydraulic control signals back to the ETRS subsystem 104 via signal lines 122, 144, 145, and 158. The clutch actuation control subsystem 106 generally includes a clutch select valve assembly 200 and a plurality of clutch regulation assemblies 202, 204, 206, 208, 210, and 212. Each of the clutch regulation assemblies 202-212 are associated with one of a plurality of clutch actuators 214, 216, 218, 220, 222, and 224. The clutch actuators 214-224 are hydraulically actuated pistons that each engage one of a plurality of torque transmitting devices (clutches or brakes) to achieve various forward, or drive, speed ratios and reverse speed ratios.

The clutch select valve assembly 200 generally includes ports 200A-K. Ports 200D and 200H are exhaust ports that communicate with the sump 107 or an exhaust backfill circuit 230. Port 200A communicates with a signal fluid line 232. Port 200B communicates with the Reverse fluid line 156. Port 200C communicates with a clutch feed line 234. Port 200E communicates with a clutch feed line 236. Port 200F communicates with a clutch feed line 238. Port 200G communicates with a selectable one-way clutch (SOWC) feed line 240. The SOWC feed line 240 communicates with a SOWC servo actuator 241 that is operable to engage a selectable one-way clutch 243. The SOWC servo actuator 241 also communicates with the Drive/signal line 144. Port 200I communicates with the signal line 144. Port 200J communicates with the Drive line 154. Port 200K communicates with a signal line 242.

The clutch select valve assembly 200 includes a spool valve 250 slidably disposed within a bore 252. The spool valve 250 is moveable between a stroked position where a spring 254 is compressed and a de-stroked position where the spring 254 is not compressed. In the de-stroked position, port 200B is closed, ports 200C and 200G exhaust, port 200F communicates with port 200E, and port 200J communicates with port 200I. Therefore, the clutch select valve 200 provides hydraulic fluid to the signal line 144 and the feed line 238 provides hydraulic fluid to feed line 236 when the first mode valve 134 is stroked, and the second mode valve assembly 136 is de-stroked. The feed line 236 communicates with the clutch actuator 214. In the stroked position port 200B communicates with port 200C, ports 200E and 200I communicate with exhaust, port 200F communicates with port 200G, and port 200J is blocked. Therefore the Reverse feed line 156 feeds the feed line 234 while the clutch feed line 238 feeds the SWOC feed line 240.

The clutch select valve assembly 200 is stroked when hydraulic fluid is communicated through a clutch select solenoid 260 to fluid port 200K via signal line 242. The clutch select solenoid 260 receives hydraulic fluid from a feed line 262 that communicates with the main supply line 112 through a feed limit valve 264. The feed line 262 also supplies hydraulic fluid to a solenoid 263 that communicates with fluid line 122 and to an oil level valve 265 that selectively transfers fluid from a front cover 267 to the sump 107. The signal line 242 also provides hydraulic fluid to a TCC regulation valve 266.

A check valve 270 is connected to fluid lines 144 and 234. The check valve 270 includes three ports 270A-C. The check valve 270 closes off whichever of the ports 270A and 270B that is delivering the lower hydraulic pressure and provides communication between whichever of the ports 270A and 270B having or delivering the higher hydraulic pressure and the outlet port 270C. Port 270A is connected to the Drive and signal line 144. Port 270B is connected to the feed line 234. Port or outlet 270C is connected to a clutch feed line 274.

A check valve 276 is connected to fluid lines 236 and 278. The check valve 276 includes three ports 276A-C. The check valve 276 closes off whichever of the ports 276A and 276B that is delivering the lower hydraulic pressure and provides communication between whichever of the ports 276A and 276B having or delivering the higher hydraulic pressure and the outlet port 276C. Port 276A is connected to a latch feed line 278. Port 276B is connected to the feed line 236. Port or outlet 276C is connected to the signal line 232.

A latch valve assembly 280 selectively communicates hydraulic fluid from the Drive/signal line 144 to the latch feed line 278. The latch valve assembly 280 is engaged by a hydraulic signal from the feed line 238.

The clutch regulation assembly 202 includes a variable force solenoid 203, a regulator valve 281 and a boost valve 282. The regulator valve 281 is connected to the Drive line 154 and to the boost valve 282. The boost valve 282 is also connected to the Drive line 154 and to an actuator feed line 284. The regulator valve 281 receives hydraulic fluid from the Drive line 154 and selectively communicates the Drive line hydraulic fluid to the boost valve 282 to move boost valve 282. The boost valve 282 in turn selectively communicates the Drive line hydraulic fluid to the actuator feed line 284. The actuator feed line 284 communicates with the clutch actuator 216.

The clutch regulation assembly 204 includes a variable force solenoid 205 and a regulator valve 283 that is connected to the Drive line 154. The regulator valve 283 receives hydraulic fluid from the Drive line 154 and selectively communicates the Drive line hydraulic fluid to an actuator feed line 286. The actuator feed line 286 communicates with the clutch actuator 218.

The clutch regulation assembly 206 includes a variable flow solenoid 207 and a regulator valve 288. The solenoid 207 is connected to the range feed line 121 and to the signal line 145. The regulator valve 288 is connected to the signal line 145, to the Drive/signal line 144 and to an actuator feed line 290. The solenoid 207 receives hydraulic fluid from the range feed line 121 and selectively communicates the range feed line hydraulic fluid to the signal line 145 in order to move the regulator valve 288. The regulator valve 288 in turn selectively communicates the Drive/signal line hydraulic fluid to the actuator feed line 290. The actuator feed line 290 communicates with the clutch actuator 220.

The clutch regulation assembly 208 includes a variable flow solenoid 209 and a regulator valve 292. The solenoid 209 is connected to the range feed line 121 and to the signal line 158. The regulator valve 292 is connected to the signal line 158, to the Drive/signal line 144 and to an actuator feed line 294. The solenoid 209 receives hydraulic fluid from the range feed line 121 and selectively communicates the range feed line hydraulic fluid to the signal line 158 in order to move the regulator valve 292. The regulator valve 292 in turn selectively communicates the Drive/signal line hydraulic fluid to the actuator feed line 294. The actuator feed line 294 communicates with the clutch actuator 222.

The clutch regulation assembly 210 includes a variable force solenoid 211 a regulator valve 285 and a boost valve 296. The regulator valve 285 is connected to the feed line 274 and to the boost valve 296. The boost valve 296 is also connected to the feed line 274 and to an actuator feed line 298. The regulator valve 285 receives hydraulic fluid from the feed line 274 and selectively communicates the feed line hydraulic fluid to the boost valve 296 to move boost valve 296. The boost valve 296 in turn selectively communicates the feed line hydraulic fluid to the actuator feed line 298. The actuator feed line 298 communicates with the clutch actuator 224.

The clutch regulation assembly 212 includes a variable force solenoid 213 and a regulator valve 287 that is connected to the main supply line 112. The regulator valve 287 receives hydraulic fluid from the main supply line 112 and selectively communicates the line pressure hydraulic fluid to the feed line 238. The position of the clutch select valve 200 determines whether the feed line 238 communicates with the feed line 236 or the SOWC feed line 240.

Selective actuation of combinations of clutch regulator assemblies and valve positions allows the hydraulic control system 100 to selectively engage combinations of the plurality of clutches and brakes.

Figure 4A:
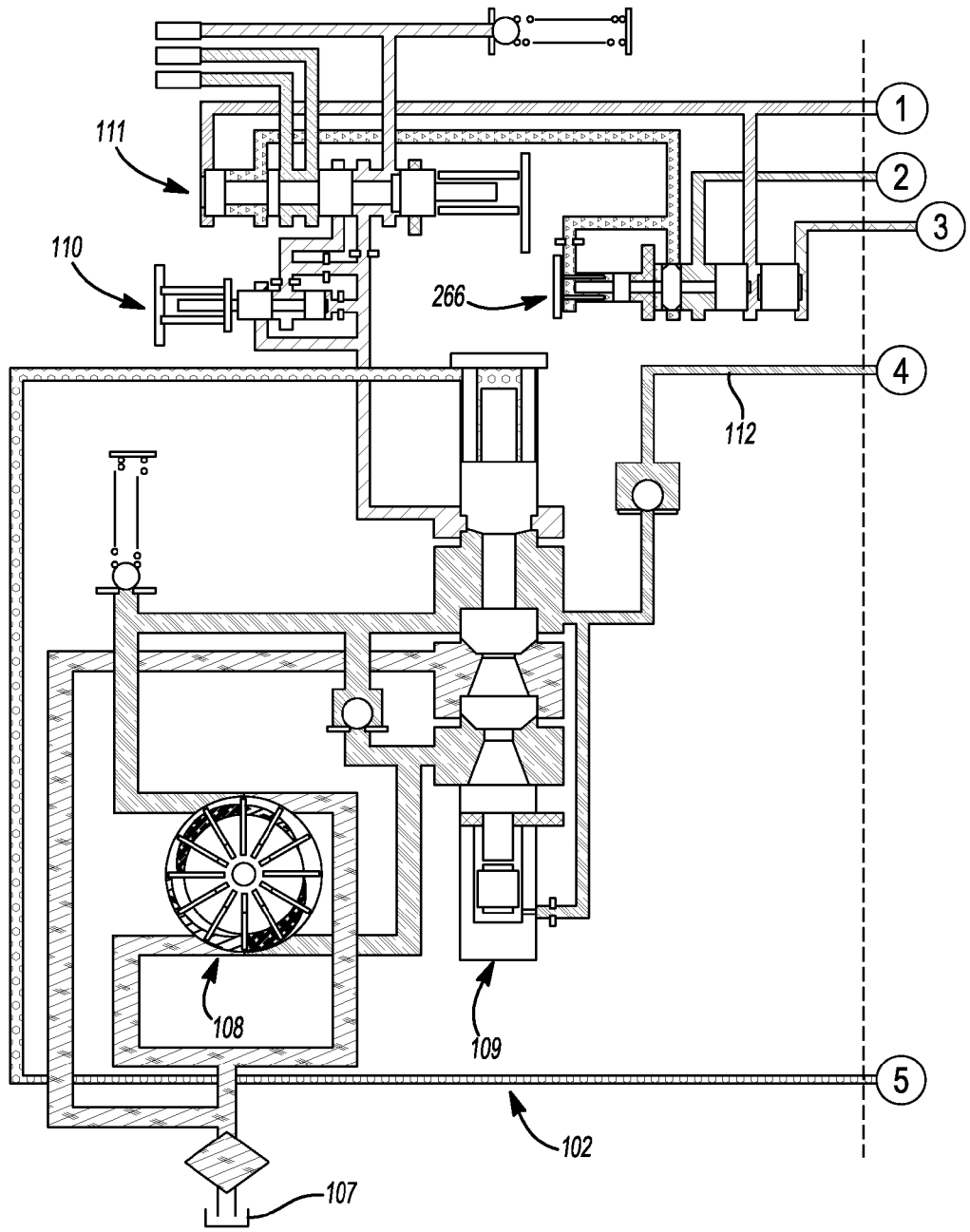
FIG. 4A is a diagram of a portion of another embodiment of a hydraulic control system having a manual valve according to the principles of the present invention.
Figure 4B:
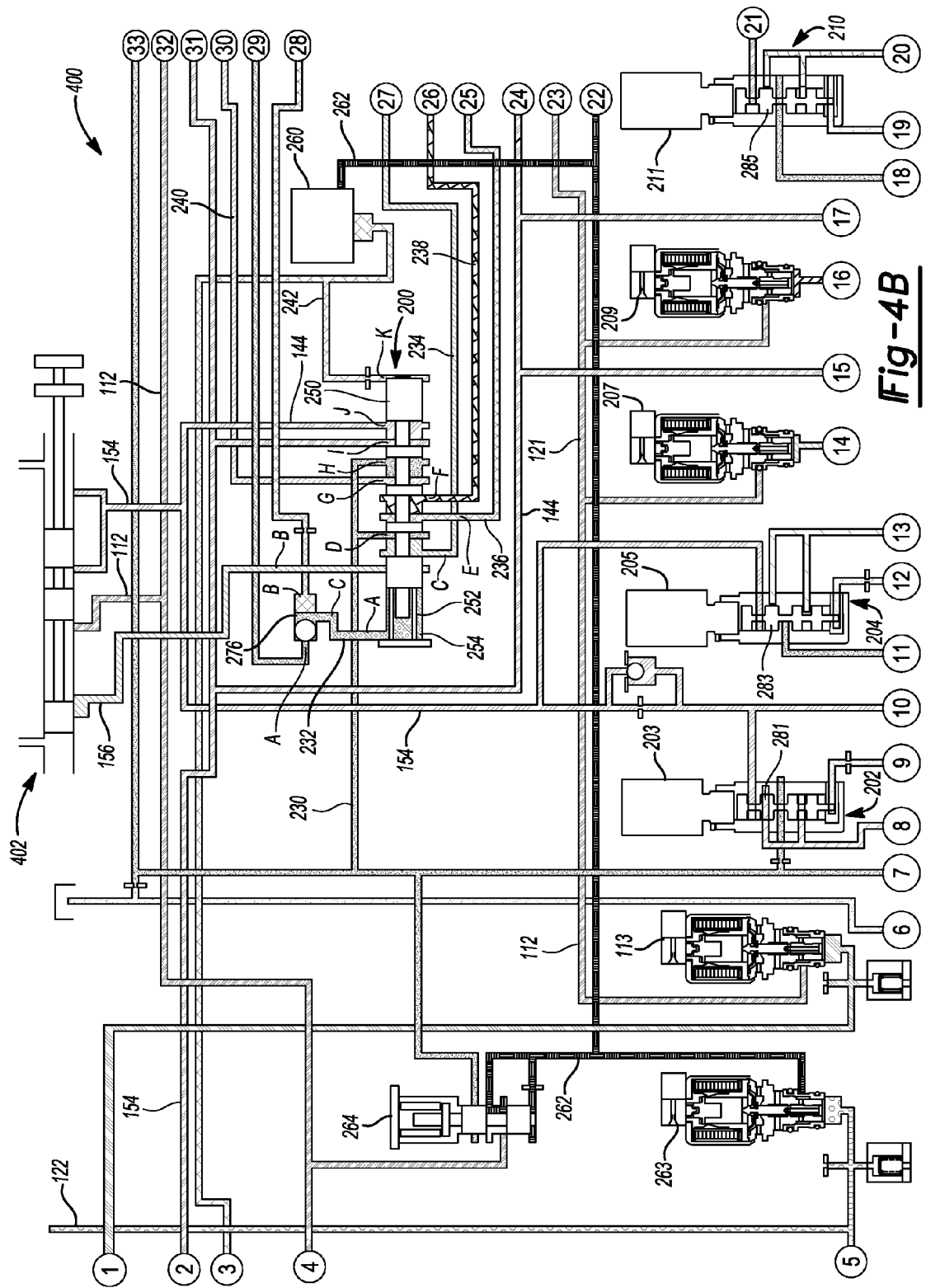
FIG. 4B is a diagram of another portion of the hydraulic control system having a manual valve according to the principles of the present invention.
Figure 4C:
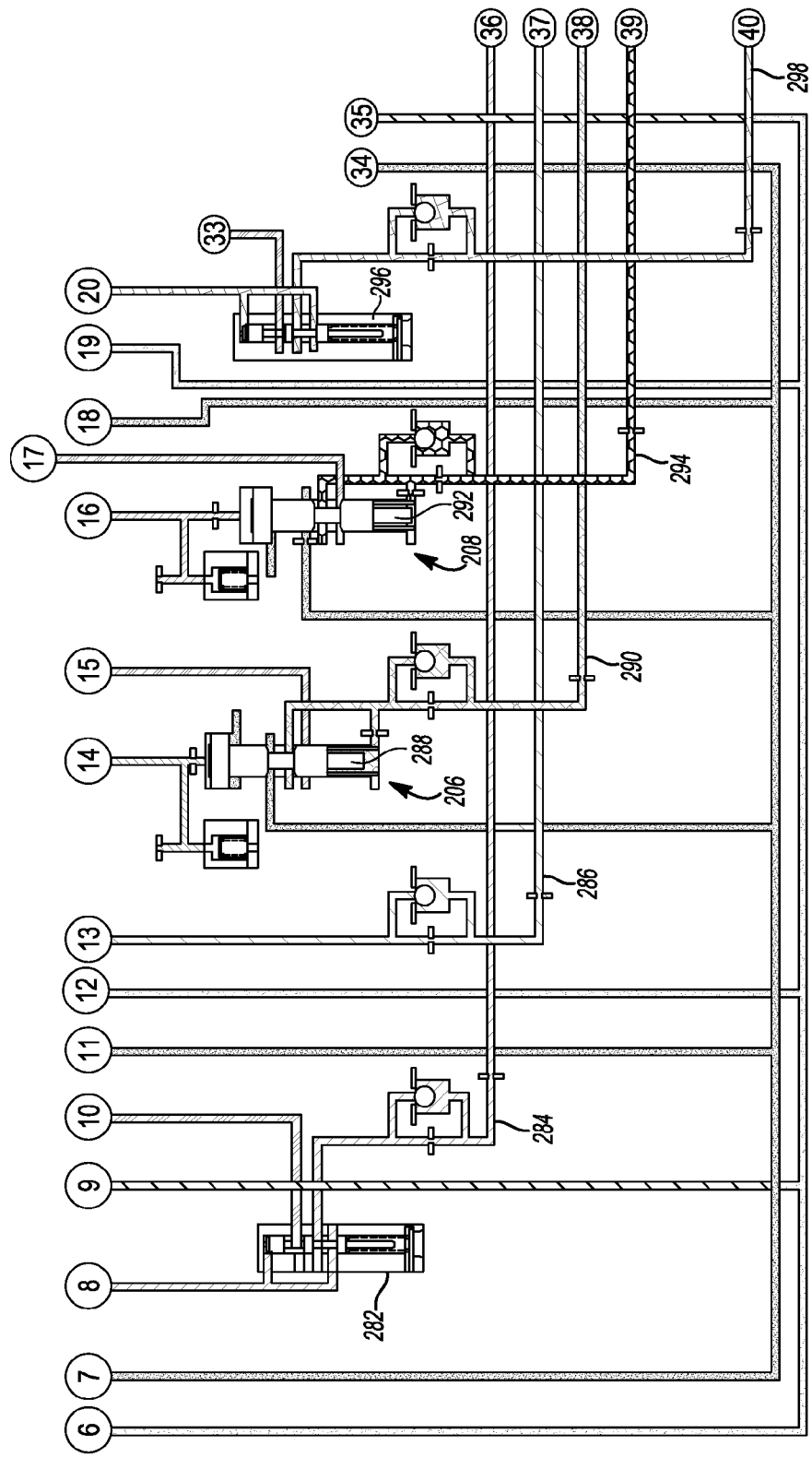
FIG. 4C is a diagram of another portion of the hydraulic control system having a manual valve according to the principles of the present invention.
Figure 4D:
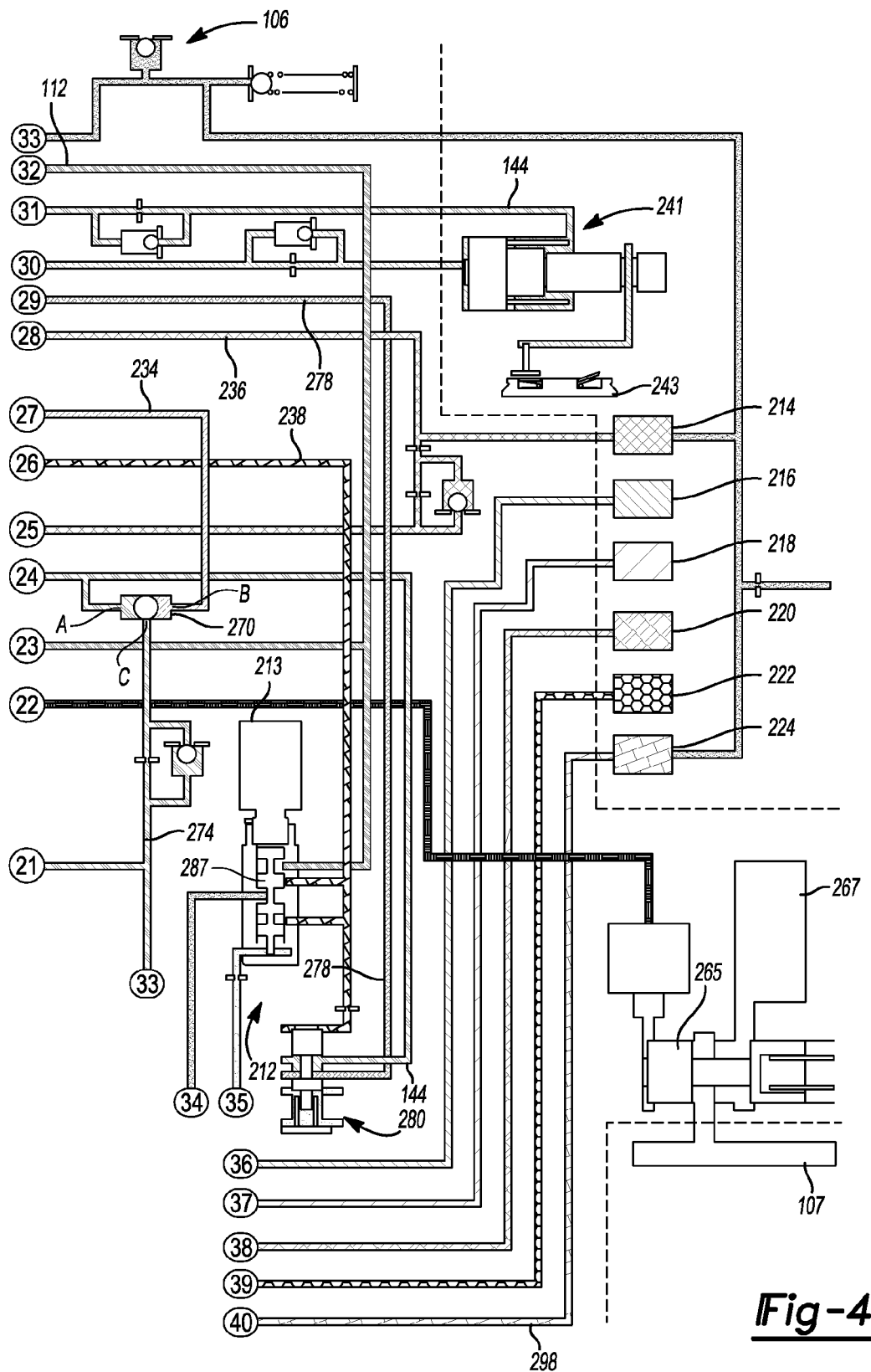
FIG. 4D is a diagram of another portion of the hydraulic control system having a manual valve according to the principles of the present invention.

Turning to FIGS. 4A-D, an alternate embodiment of a hydraulic control system is generally indicated by reference number 400. The hydraulic control system 400 is substantially similar to that shown in FIGS. 1-3 and like components are indicated by like reference numbers. However, in the hydraulic control system 400, the ETRS subsystem has been replaced by a manual valve 402. The manual valve 402 communicates with the main supply line 112, the Reverse line 156, and the Drive line 154. Movement of a range selector 404 of an operator of the motor vehicle in turn translates the manual valve 402 between various positions including a Reverse position and a Drive position. In the Drive position, the main supply line 112 provides hydraulic fluid at line pressure to the Drive line 154. In the Reverse position, the main supply line 112 provides hydraulic fluid at line pressure to the Reverse line 156.

The description of the invention is merely exemplary in nature and variations that do not depart from the general essence of the invention are intended to be within the scope of the invention. Such variations are not to be regarded as a departure from the spirit and scope of the invention.

The following is claimed:

1. A hydraulic control system for a transmission, the transmission having six torque transmitting devices and one selectable one-way clutch selectively engageable to provide nine forward speed ratios and at least one reverse speed ratio, the hydraulic control system comprising:
    a pressure regulator subsystem for providing a pressurized hydraulic fluid;
    a range selection subsystem in downstream fluid communication with the pressure regulator subsystem and having first and second outputs;
    a first control device in downstream fluid communication with the pressure regulator subsystem;
    a clutch select valve assembly in downstream fluid communication with the first and second outputs and the first control device, wherein the clutch select valve assembly operates in first and second states;
    a servo in downstream fluid communication with the clutch select valve assembly for actuating a selectable one-way clutch;
    a first actuator in downstream fluid communication with the clutch select valve assembly for actuating a first torque transmitting mechanism;
    a second actuator in downstream fluid communication with the clutch select valve assembly for actuating a second torque transmitting mechanism; and
    third, fourth, fifth, and sixth actuators in downstream fluid communication with the pressure regulator subsystem each for actuating one of a third, fourth, fifth, and sixth torque transmitting mechanisms,
    wherein the clutch select valve assembly transmits pressurized hydraulic fluid from the first output to the servo and from the first control device to the first actuator when in the first state and wherein the clutch valve assembly transmits pressurized hydraulic fluid from the first control device to the servo and from the second output to the second actuator when in the second state.

2. The hydraulic control system of claim 1 wherein the second actuator and second torque transmitting mechanism are engaged in a Reverse gear state.

3. The hydraulic control system of claim 1 wherein the first selectable one-way clutch and the first actuator and first torque transmitting mechanism are engaged in a Drive gear state.

4. The hydraulic control system of claim 1 further comprising second, third, fourth, fifth, and sixth control devices each disposed between one of the second, third, fourth, fifth, and sixth actuators and the pressure regulator subsystem.

5. The hydraulic control system of claim 4 wherein the first, second, third, fourth, fifth, and sixth control devices are electrically activated solenoids.

6. The hydraulic control system of claim 1 wherein the range selection subsystem comprises a manual valve in downstream fluid communication with the pressure regulator subsystem, and wherein the manual valve operates in a Drive state that transmits pressurized hydraulic fluid from the pressure regulator subsystem to the first output and in a Reverse state that transmits pressurized hydraulic fluid from the pressure regulator subsystem to the second output.

7. The hydraulic control system of claim 1 wherein the range selection subsystem comprises:
    an enablement valve assembly in downstream fluid communication with the pressure regulator subsystem;
    a first mode valve assembly in downstream fluid communication with the enablement valve assembly;
    a second mode valve assembly in downstream fluid communication with the first mode valve assembly;
    wherein the enablement valve assembly transmits pressurized hydraulic fluid from the pressure regulator subsystem to the first mode valve when in a Drive or Reverse state, wherein the first mode valve assembly transmits pressurized hydraulic fluid from the enablement valve assembly to the second mode valve assembly, and the second mode valve assembly transmits pressurized hydraulic fluid from the first mode valve assembly to the first output when in a Drive state and the second mode valve assembly transmits pressurized hydraulic fluid from the first mode valve assembly to the second output when in a Reverse state.

8. The hydraulic control system of claim 1 further comprising a clutch select solenoid in fluid communication with the clutch select valve assembly for changing the operating state of the clutch select valve assembly.

9. A hydraulic control system for a transmission, the transmission having a Park mode and an Out of Park mode of operation, the transmission having a plurality of torque transmitting devices selectively engageable to provide at least one forward speed ratio and at least one reverse speed ratio when in the Out of Park mode of operation, the hydraulic control system comprising:
    a pressure regulator subsystem for providing a pressurized hydraulic fluid;
    an enablement valve assembly in downstream fluid communication with the pressure regulator subsystem and having an enablement valve moveable between a first position and a second position;
    a first mode valve assembly in downstream fluid communication with the enablement valve assembly and having a first mode valve moveable between a Park position and an Out of Park position;
    a second mode valve assembly in downstream fluid communication with the first mode valve assembly and having a second mode valve moveable between a Drive position and a Reverse position;
    a park servo in downstream fluid communication with the first mode valve assembly and the second mode valve assembly;
    a park lock mechanism mechanically coupled to the park servo, wherein the park servo mechanically moves the park lock mechanism to place the transmission in the Park condition when the enablement valve is in the first position, the first mode valve is in the Park position, and the second mode valve is in the Park position, and wherein the park servo moves the park lock mechanism to place the transmission in the Out of Park condition when the enablement valve is in the first position, the first mode valve is in the Out of Park position, and the second mode valve is in the Drive position or the Reverse position; and
    a clutch actuator subsystem in downstream fluid communication with the second mode valve assembly for selectively actuating the torque transmitting devices upon receipt of the pressurized hydraulic fluid.

10. The hydraulic control system of claim 9 wherein the enablement valve assembly includes a line input in downstream fluid communication with the pressure regulator subsystem and a range feed output, and wherein the line input communicates with the range feed output when the enablement valve is in the first position.

11. The hydraulic control system of claim 10 wherein the first mode valve assembly includes a range feed input, a first output, and a second output, and wherein the range feed input is in downstream fluid communication with the range feed output and the range feed input communicates with the first output when the first mode valve is in the Out of Park position and the range feed input communicates with the second output when in the Park position.

12. The hydraulic control system of claim 11 wherein the second mode valve assembly includes a first input, a second input, a Drive output, and a Reverse output, wherein the first input is in downstream fluid communication with the first output, the second input is in downstream fluid communication with the second output, and wherein the first input communicates with the Drive output when the second mode valve is in the Drive position and wherein the second input communicates with the Reverse output when the second mode valve is in the Reverse position.

13. The hydraulic control system of claim 12 wherein the clutch actuator subsystem comprises:
a first control device in downstream fluid communication with the pressure regulator subsystem;
a clutch select valve assembly in downstream fluid communication with the Drive and Reverse outputs and the first control device, wherein the clutch select valve assembly operates in first and second states;
a servo in downstream fluid communication with the clutch select valve assembly for actuating a selectable one-way clutch;
a first actuator in downstream fluid communication with the clutch select valve assembly for actuating a first torque transmitting mechanism;
a second actuator in downstream fluid communication with the clutch select valve assembly for actuating a second torque transmitting mechanism; and
third, fourth, fifth, and sixth actuators in downstream fluid communication with the pressure regulator subsystem each for actuating one of a third, fourth, fifth, and sixth torque transmitting mechanisms,
wherein the clutch select valve assembly transmits pressurized hydraulic fluid from the Drive output to the servo and from the first control device to the first actuator when in the first state and wherein the clutch valve assembly transmits pressurized hydraulic fluid from the first control device to the servo and from the Reverse output to the second actuator when in the second state.

14. The hydraulic control system of claim 13 wherein the second actuator and second torque transmitting mechanism are engaged in a Reverse gear state.

15. The hydraulic control system of claim 14 wherein the first selectable one-way clutch and the first actuator and first torque transmitting mechanism are engaged in a Drive gear state.

16. The hydraulic control system of claim 15 further comprising second, third, fourth, fifth, and sixth control devices each disposed between one of the second, third, fourth, fifth, and sixth actuators and the pressure regulator subsystem.

17. The hydraulic control system of claim 16 wherein the first, second, third, fourth, fifth, and sixth control devices are electrically activated solenoids.

18. A hydraulic control system for a transmission, the transmission having six torque transmitting devices and one selectable one-way clutch selectively engageable to provide nine forward speed ratios and at least one reverse speed ratio, the hydraulic control system comprising:
a pressure regulator subsystem for providing a pressurized hydraulic fluid;
a manual valve in downstream fluid communication with the pressure regulator subsystem, and wherein the manual valve operates in a Drive state that transmits pressurized hydraulic fluid from the pressure regulator subsystem to a first output and in a Reverse state that transmits pressurized hydraulic fluid from the pressure regulator subsystem to a second output;
a first control device in downstream fluid communication with the pressure regulator subsystem;
a clutch select valve assembly in downstream fluid communication with the first and second outputs and the first control device, wherein the clutch select valve assembly operates in first and second states;
a servo in downstream fluid communication with the clutch select valve assembly for actuating a selectable one-way clutch;
a first actuator in downstream fluid communication with the clutch select valve assembly for actuating a first torque transmitting mechanism;
a second actuator in downstream fluid communication with the clutch select valve assembly for actuating a second torque transmitting mechanism; and
third, fourth, fifth, and sixth actuators in downstream fluid communication with the pressure regulator subsystem each for actuating one of a third, fourth, fifth, and sixth torque transmitting mechanisms,
wherein the clutch select valve assembly transmits pressurized hydraulic fluid from the first output to the servo and from the first control device to the first actuator when in the first state and wherein the clutch valve assembly transmits pressurized hydraulic fluid from the first control device to the servo and from the second output to the second actuator when in the second state.

19. The hydraulic control system of claim 18 wherein the second actuator and second torque transmitting mechanism are engaged in a Reverse gear state.

20. The hydraulic control system of claim 19 wherein the first selectable one-way clutch and the first actuator and first torque transmitting mechanism are engaged in a Drive gear state.

* * * * *